United States Patent [19]

Braid

[11] 3,759,996
[45] Sept. 18, 1973

[54] PROCESS FOR DIMERIZING DIARYLAMINES
[75] Inventor: Milton Braid, Westmont, N.J.
[73] Assignee: Mobil Oil Corporation, New York, N.Y.
[22] Filed: Jan. 13, 1971
[21] Appl. No.: 106,248

[52] U.S. Cl. .................................. 260/576, 260/571
[51] Int. Cl. ............................................. C07c 87/64
[58] Field of Search ............................. 260/576, 571

[56] References Cited
UNITED STATES PATENTS
3,509,214   4/1970   Braid et al. ......................... 260/576

OTHER PUBLICATIONS
Peeler, A. C. S. Division of Petroleum Chemistry, Preprints 10(2), D-119 (1965).

Theilheimer, Synthetic Methods of Organic Chemistry, Interscience Pub., Inc.: N.Y. Vol. 2 (1949), No. 633. Vol. 10 (1956), No. 565.

Primary Examiner—Lewis Gotts
Assistant Examiner—C. F. Warren
Attorney—Oswald G. Hayes, Andrew L. Gaboriault, Raymond W. Barclay and Claude E. Setliff

[57] ABSTRACT

Dimers of diarylamines are prepared by a process comprising treating a diarylamine-perchlorate salt with an oxidizing agent in an acidic medium. Exemplary of the products obtained is 4,4'-dianilino-1,1'-binaphthyl, which is made by treating N-phenyl-α-naphthylamine-perchlorate with chromium trioxide in acetic acid and water. The products thus produced are useful antioxidants in lubricants.

9 Claims, No Drawings

PROCESS FOR DIMERIZING DIARYLAMINES

BACKGROUND OF THE INVENTION

1. Field of the Invention

The invention relates to a process for making carbon-carbon linked dimers of N-phenyl-α-naphthylamine (PAN), N-phenyl-β-naphthylamine (PBN) and substituted derivatives thereof. More particularly, the invention relates to making such dimers by reacting an amine-perchlorate salt with an oxidizing agent, as for example a metal oxide, in an acidic solvent medium.

2. Summary of the Prior Art

The oxidation of PAN with chromium trioxide in a mixture of acetic and sulfuric acids has been reported by R. L. Peeler, A.C.S. Division of Petroleum Chemistry, Preprints 10 (2), D-119 (1965). However, as will appear hereinafter, it has been found that yields of the dimer, considered by Peeler to be crude N,N'-diphenylnaphthidine, are low when PAN, chromium trioxide and a mixture of acetic and sulfuric acids are reacted together.

U.S. application Ser. No. 537,639, filed Mar. 28, 1966, in the names of Milton Braid and Derek A. Law, now U.S. Pat. No. 3,509,214, discloses a process for producing a mixture of dimers, trimers and tetramers by oxidizing N-arylnaphthylamines with air and various other oxidizing agents such as potassium permanganate, lead dioxide, manganese dioxide and hydrogen peroxide. Although mass spectral data indicated that about 42% of dimer was obtained in the oxidation of N-phenyl-α-naphthylamine with potassium permanganate, separation of dimers of specific structure was impractical.

SUMMARY OF THE INVENTION

In accordance with the invention, there is provided a process for oxidatively dimerizing N-phenyl-α-naphthylamine, N-phenyl-β-naphthylamine and the $C_1$-$C_{20}$ alkyl-, $C_1$-$C_{12}$ alkoxy-, and nitro-substituted derivatives thereof comprising the step of treating a perchlorate salt of said amine in the presence of a mixture comprising an oxidizing agent, such as a metal oxide, and an organic acid, preferably an aqueous organic acid.

The products produced by this process impart antioxidant properties to lubricants, especially to synthetic ester lubricants prepared from pentaerythritol and monocarboxylic acids.

DESCRIPTION OF SPECIFIC EMBODIMENTS

As has been mentioned, the oxidation of N-phenyl-α-naphthylamine (hereinafter referred to as PAN) with chromium trioxide in a mixture of acetic and sulfuric acids has been reported to produce the dimer (4,4'-dianilino-1,1'-dinaphthyl). It was found, however, that the yield of carbon-carbon dimer which could be isolated from this system amounted to only a very small amount, based on the amine. It has been surprisingly discovered that if the perchlorate salt of a diarylamine is used instead of the amine per se, good yields are obtained upon reacting such salt in a special oxidizing medium.

In general aspect, the inventive process involves the presence in the system of an amine perchlorate salt which does not de-protonate during the oxidation. Perchloric acid reacts smoothly with diarylamines to form salts which appear to be stable during oxidation.

The best yields of dimer have been obtained with the amine perchlorate salts by oxidizing same with a metal oxide, such as chromium oxide, in the presence of acetic acid and water. In carrying out this reaction, the salt may be preformed by the addition of peracid to amine, or the product may be obtained by the metal oxide oxidation of the salt formed in situ in an organic acid medium. Such acid medium may include aqueous acetic, propionic or trifluoroacetic acid. Of these, acetic acid is preferred. This latter method is preferably carried out just at the solubility limit of amine in the system, i.e., the system is saturated with the amine. The in situ reactions may be carried out in the presence of an inert solvent, such as water or one of the organic solvents mentioned below for use in making the preformed salt.

When the salt is preformed, its preparation may be carried out in the presence of an inert organic solvent, such as benzene. Other solvents which may be used include cyclohexane, hexane and isooctane. In general, any inert organic solvent may be used, but those in which the salt is insoluble are preferred because the salt is easily removed by filtration.

Oxidation of the amine perchlorate salt is accomplished at a temperature within the range of from about 0°C. to about 25°C., preferably from about 0°C. to about 10°C.

In addition to chromium trioxide, which is the preferred metal oxide, other oxidizing agents may be used. They include lead dioxide, nitrous acid, nitric acid, potassium permanganate, manganese dioxide and hydrogen peroxide.

Having described the process in general terms, the following will specifically illustrate the invention. It will be understood that the matter following is intended for illustrative purposes only.

EXAMPLE 1

To a solution of 110 g. of PAN in 600 ml. of glacial acetic acid was added while stirring during 0.5 hour a solution of 25 g. of chromium trioxide in 120 ml. of acetic acid, 50 ml. of water and 36 ml. of conc. sulfuric acid. Stirring was continued for 0.5 hour, and the reaction mixture was poured into about 2 l. of water. The solids which precipitated were collected and extracted with ethanol. The residue after evaporation of the ethanol, 20.8 g., was extracted with petroleum ether and the residue was crystallized from ethyl acetate. There was finally obtained a total of 1.5 g. of 4,4'-dianilino-1,1'-binaphthyl. The fraction melting at 180–182°C (grey solids), gave the following analysis:

Calc'd for $C_{32}H_{24}N_2$: C, 88.04%; H, 5.54%; N, 6.42%; Mol. Wt. 437

Found: C, 87.61%; H, 5.91%; N, 6.27%; Mol. Wt. 430

Example 1 illustrates the use of prior art reactions such as the one disclosed by Peeler as mentioned above.

Example 2

To 43.8 g. of PAN dissolved in 400 ml. of glacial acetic acid there were added 56 ml. of water and 30.8 g. of 71.4% perchloric acid. To the resulting mixture there was added during 0.25 hour while stirring a solution of 7 g. of chromium trioxide in 20 ml. of water. After an additional 10 minutes of stirring, 450 ml. of water was added and the solids in the reaction mixture were collected by filtration, giving 48.1 g. The solids were extracted with benzene to yield 43 g. (98%) of the crude 4,4'-dianilino-1,1'-binaphthyl. The pure dimer was isolated by crystallization from benzene, from ether, or from ethyl acetate after removal of the benzene by evaporation or distillation. The dimer obtained by crystallization from benzene, nearly white crystals, melted at 182–183°C and gave the following analysis:

Calc'd for $C_{32}H_{24}N_2$: C, 88.04%; H, 5.54%; N, 6.42%; Mol. Wt. 437

Found: C, 88.81%; H, 5.85%; N, 6.81%; Mol Wt. 422

EXAMPLE 3

To a solution of 99.3 g. of N-(1,1,3,3-tetramethylbutyl-phenyl)-1-naphthylamine in 500 ml. of glacial acetic acid cooled to 25°C there was added while cooling 49 g. of 71.4% perchloric acid. When the resulting solution had cooled to 15°C there were added a further 75 ml. of acetic acid and 75 ml. of water. To the resulting reaction mixture there was added during 1 hour at 10°C a solution of 10.5 g. of chromium trioxide in 30 ml. of water. The reaction mixture was stirred at 10–20°C for one additional hour, 200 ml. of water was added, and the solids were collected by filtration (108.3 g.). The dimer, N,N'-di-(1,1,3,3-tetramethylbutylphenyl)-1,1'-naphthidine, was obtained by crystallization from benzene as white crystals, melting at 159–161°C.

Anal. Calc'd for $C_{48}H_{56}N_2$: C, 87.22%; H, 8.54%; N, 4.24%; Mol. Wt. 661

Found: C, 86.36%; H, 8.46%; N, 4.24%; Mol. Wt. 633

EXAMPLE 4

To 4.38 g. of PBN dissoled in 80 ml. of glacial acetic acid there was added 3.08 g. of 71.4% perchloric acid. To the resulting reaction mixture there was added during 5 minutes a solution of 0.7 g. of chromium trioxide in 2 ml. of water. The reaction mixture was stirred for an additional 10 minutes and was then poured into 400 ml. of water. There was collected from the aqueous mixture 2.44 g. of crude product by filtration, from which the dimer, 1,1'-bis(N-phenyl-2-naphthylamine), a white solid melting at 167–168°C., was obtained.

The dimers produced in the process of this invention impart antioxidant properties to lubricants. These include mineral oils, both paraffinic and naphthenic, as well as synthetic lubricating oils such as polymerized olefins, polymerized alkylene oxides and the like, and esters. Representative of synthetic esters are diesters from monohydric alcohols and dicarboxylic acids, and such esters as those made from polyhydric alcohols and monocarboxylic acids. Preferred among the esters prepared using polyhydric alcohols are those from pentaerythritol and a monocarboxylic acid containing from about five to about 9 carbon atoms (or mixtures of such acids).

The following will specifically illustrate the use of the dimers produced in Examples 2 and 3.

The product was tested in a catalytic oxidation test for lubricants, using as the base medium a synthetic ester lubricant prepared by esterifying a mixture of commercial grades of valeric and pelargonic acids with a technical grade of pentaerythritol (containing about 12% of dipentaerythritol). The test composition was subjected to a stream of air bubbled therethrough at a rate of 5 liters per hour. This was continued for 24 hours at 450°F. Lead was present in the composition.

Inhibition caused by the additives was rated on the basis of prevention of oil deterioration by measuring the increase in acid formation or neutralization number (NN) and kinematic viscosity occasioned by oxidation. The following table shows the results.

| Additive | Conc. Wt.% | NN Increase | % Increases as KV at 100°F. |
|---|---|---|---|
| None | — | 8.25 | 585 |
| 4,4'-dianilino -1,1'-binaphthyl | 1 | 3.05 | 17 |
| 4,4'-di-(p-1,1,13,3 -tetramethylbutyl- anilino)-1,1'-binaphthyl | 0.75 | 3.38 | 38 |

Having described the invention, what is claimed is:

1. A process for oxidatively dimerizing an amine selected from the group consisting of N-phenyl-α-naphthylamine, N-phenyl-β-naphthylamine and the substituted members thereof, wherein the sbustituents are selected from the group consisting of $C_1$-$C_{20}$ alkyl, $C_1$-$C_{12}$ alkoxy and nitro consisting essentially of the step of allowing a perchlorate salt of said amine to dimerize at a temperature within the range of from about 0°C to about 25°C in the presence of a mixture consisting essentially of (1) an oxidizing agent selected from the group consisting of chromium trioxide, lead dioxide, nitrous acid, nitric acid, potassium permanganate, manganese dioxide and hydrogen peroxide and (2) an organic acid selected from the group consisting of acetic acid, propionic acid and trifluoroacetic acid.

2. The process of claim 1 wherein the perchlorate salt is prepared prior to treatment with said mixture.

3. The process of claim 1 wherein the perchlorate salt is formed in situ.

4. The process of claim 1 wherein the organic acid is saturated with N-phenyl-α-naphthylamine.

5. The process of claim 1 wherein the organic acid is saturated with N-phenyl-β-naphthylamine.

6. The process of claim 1 wherein the organic acid is saturated with N-1,1,3,3-tetramethylbutylphenyl)-α-naphthylamine.

7. The process of claim 1 wherein the oxidizing agent is chromium trioxide.

8. The process of claim 1 wherein the acid is acetic acid.

9. The process of claim 1 wherein water is present in said mixture.

* * * * *

PO-1050
(5/69)

UNITED STATES PATENT OFFICE
CERTIFICATE OF CORRECTION

Patent No. 3759996          Dated September 18, 1973

Inventor(s)  Milton Braid

It is certified that error appears in the above-identified patent and that said Letters Patent are hereby corrected as shown below:

Column 3, line 35, "dissoled" should be -- dissolved --

Column 4, line 21, "(p-1,1,13,3" should be
  -- (p-1,1,3,3 --

Column 4, line 49, "N-1,1,3,3" should be
  -- N-(p-1,1,3,3 --

Signed and sealed this 25th day of December 1973.

(SEAL)
Attest:

EDWARD M. FLETCHER, JR.            RENE D. TEGTMEYER
Attesting Officer                  Acting Commissioner of Patents